United States Patent [19]

Butterfield

[11] 3,818,125

[45] June 18, 1974

[54] STEREO TELEVISION MICROSCOPE

[76] Inventor: James F. Butterfield, 13952 Weddington Ave., Van Nuys, Calif. 91401

[22] Filed: Oct. 26, 1971

[21] Appl. No.: 192,012

[52] U.S. Cl. .................. 178/6.5, 178/7.85, 178/7.91
[51] Int. Cl. .................................................. H04n 9/54
[58] Field of Search. 178/DIG. 1, DIG. 35, DIG. 38, 178/6.5, 6.8, 7.85, 7.91; 350/14, 148

[56] References Cited

UNITED STATES PATENTS

| | | | |
|---|---|---|---|
| 2,594,758 | 4/1952 | Fischer | 350/148 |
| 3,358,078 | 12/1967 | Ratliff | 178/6.5 |
| 3,358,079 | 12/1967 | Banning | 178/6.5 |
| 3,457,364 | 7/1969 | Carrillo | 178/6.5 |
| 3,670,097 | 6/1972 | Jones | 178/6.5 |
| 3,721,759 | 3/1973 | Lang | 178/DIG. 1 |

*Primary Examiner*—Howard W. Britton
*Attorney, Agent, or Firm*—Lyon & Lyon

[57] ABSTRACT

There is disclosed herein a stereo television microscope apparatus and system including a housing with beam splitting optics therein which pick up two slightly different images of a small object and relay such images through an optics system to the pickup tube of a television camera. The television camera is connected with a television monitor which displays the two adjacent images. Optics in the face plate of the hood associated with the monitor enable the viewer to observe a single magnified television picture of the object in three dimensions. The instrument can be used in place of a regular optical stereo microscope. The television picture from one device can be connected to and viewed by any desired number of other such devices for group instruction, on-line inspection, transmission of pictures to remote areas for analysis, and so forth. Also, the stereo television picture may be recorded on a recording media, such as video tape or film, for later playback.

28 Claims, 19 Drawing Figures

STEREO TELEVISION MICROSCOPE

The present invention relates generally to microscopes, particularly to a stereo microscope device combined with a television system for enabling local and remote three dimensional viewing, as well as two dimensional viewing where desired, of small objects.

BACKGROUND OF THE INVENTION

Optical stereo microscopes have been available for many years and they are used particularly for low power (8X to 100X) viewing of specimens. In recent years such microscopes have been used in increasing numbers for the assembly, inspection and analysis of small electronic components, such as transistors and integrated circuits. Television as a medium of communicating pictorial information remotely has also been available for several decades. Television has been used to observe microscopic views in two non-stereo manners. In the first manner, the television camera has been connected to ordinary microscopes by making a mechanical and optical connection between the eye piece and the television camera. Secondly, television cameras have been used directly with an extender tube between the lens and the TV camera for obtaining increased magnification over that usually afforded by the lens. Some-times still or motion picture cameras are used to record two dimensional microscopic views. However, adjustments for focus, field of view, and lens opening have been found to be difficult.

There have also been a few systems of three dimensional television proposed for viewing ordinary scenes. In most of these systems two cameras are used, each camera acting as one of the viewer's eyes. Then each camera is connected to a cathode ray tube, and some optical means is used to super-impose the pictures and channel one to each eye. One such proposal is that the cathode ray tubes each be 1 inch in diameter and they be supported one in front of each eye. Another system is to transmit the stereo pair of images sequentially, that is, first the left eye view is picked up, transmitted and seen by the left eye, and then the same is done for the right eye view. This alternation of views must take place rapidly to avoid flicker. Shutters are usually used for pickup, and shutters or anaglyph means are used at the receiver. Another method is to pick up and display the picture with lenticular means wherein the left and right eye views are in the form of thin strips of stereo pairs, which are viewed without glasses with a grid or lenticular type of screen. This system has not been adapted satisfactorily to television pictures.

The present invention, on the other hand, is principally concerned with combining a single television camera and single monitor in a single housing (although remote monitors may be used) and then adding optics at the camera and monitor so that the viewer sees a magnified picture of small objects in all three dimensions. The two images, one for each eye, are picked up with beam splitting optics from different points and relayed through the lens and an extender tube to fall adjacently on the front of the TV pick up tube. The two images are displayed behind two apertures adjacently on the cathode ray tube. Convergence optics and masks are used to channel one image to each eye through a hood enclosure and superimpose them. Adjustments can be made to vary the magnification by zooming or changing objective lenses.

Bearing for foregoing in mind, it is the primary object of this invention to provide a method and apparatus for easily and conveniently viewing small objects in three dimensions using television equipment.

Another object of this invention is to provide ease of viewing. With the ordinary optical stereo microscope the binocular eye pieces must be adjusted for each individual's eyes and the viewer must maintain a fixed head position; any slight movement causes him to lose the picture. This is tiring and results in poor efficiency and errors, particularly in the assembly and inspection of miniature electronic components. With the stereo television microscope the viewer can move his head from side to side or forward and backward over a considerable range without loss of the picture. Corrective glasses can also be worn without interferring with viewing. Furthermore, the picture can be positioned conveniently so the viewer does not need to bend over.

Another object of the invention is to provide greater working distances than are normally possible with an optical stereo microscope. This is due to some of the size magnification being electronic. This additional working distance makes assembly and other procedures easier to perform, as more space is allowed for tools. In the ordinary stereo microscope there is very little room between the objective of the microscope and the objects under view.

A further object of this invention is to provide a greater depth of field. With the optical stereo microscope the depth of field is limited. Portions of the picture closer or further away than a certain limited range become blurred. Refocusing is required, which takes extra time and leads to errors. As a result of electronic and optical magnification according to the present concepts the stereo effect is perceived over a greater range of distance making production procedures faster and easier.

Another object of this invention is to provide a picture which is upright and easy to view. Many optical stereo microscopes reverse or invert the picturemaking manipulation and assembly difficult or require complex optics to "right" the picture.

Still another object of this invention is to provide a variable stereo base. This is desirable so that the scene viewed has the same depth proportion as the way that we normally view depth. For example, an individuals eyes are approximately 2 ½ inches apart (this is the stereo base) and depth perception is best at close distances, such as the distance from the eyes to the arms extended which may be approximately 24 inches. Therefore, at a working distance of 8 inches the stereo base of the microscope should be .83 inches and at a working distance of 1 ½ inch the stereo base should be .16 inch. The optical stereo microscope does not preserve this proportion and because its stereo base is fixed which means that the depth perception at low magnification is considerably flattened and at high magnification it is exaggerated. However, with the stereo television microscope the stereo base can be adjusted for magnification, whereas the stereo base of the optical stereo microscope is fixed and is suitable for some magnifications and not for others.

One of the significant objects of the stereo television microscope of the present invention is that the electronic picture from one of these microscopes can be transmitted by cable or broadcast to another one or to a group of stereo microscopes. This is useful for instruction work where normally only one person can see the picture with an optical stereo microscope. In that case each individual viewer and instructor must take turns, back and forth, looking through the single microscope. There are on the market a few stereo microscopes which have a monocular tube off to one side permitting a student to view in 2D while the instructor does work in 3D or vice versa. There also are available expensive dual microscopes which permit both the instructor and student to view the picture in 3D. However, these only permit instruction on a one to one basis. On the other hand, with the use of the stereo television microscope any number of students can watch in 3D while an instructor performs a particular operation. Then he can throw a switch and ask one of the students to duplicate the an operation, and then he and all of the other students can view that attempt. Furthermore, the instructor can make a video tape of a particular lesson on an ordinary video tape recorder and then this can be played back to the students without the instructor needing to be present. A further advantage is that inspection can take place "on line." In other words, the inspector can throw a switch and view on his stereo television microscope the work being done by any one of a number of assemblers. If some particular feature or aspect of a procedure needs to be recorded for further analysis it can be done so on any video tape recorder, or by kinescope or by Polaroid camera. Furthermore, pictures can be transmitted from one location, such as one area of a school or factory, to another by broadcasting or by cable. This takes the information to be viewer without the necessity of him having to travel to where the object is located.

A further object is that the electronic picture can be digitized for computer processing, storage and later display. Electronic image analysis or enhancement is then possible.

While the principle object of this invention is use as a stereo television microscope, another object is use as a non-stereo television microscope. This is accomplished by the removal of the stereo optics from the lens of the TV camera and by hinging the hood so that it, its mask and optics can be swung aside. In this case a single magnified view of the specimen is observed on the cathode-ray tube screen. All the other non-stereo advantages are retained. In this way the instrument can be used as a zoom stereo microscope for low magnifications (8X to 200X) and a non-stereo display microscope for high magnifications or where stereo is not of significant interest. Very high magnifications can be accomplished with an additional lens system which interchangeably replaces the stereo optics.

Another object relates to use of one of the optical systems to provide a general view of the speciman area at a low magnification and the other to provide a close-up view of the speciman at high magnification. In this case the optics for the dual picture pick-up at the camera are retained. The mask at the CRT tube is retained and the hood is swung aside. Then the worker has in one of the apertures of the mask a wide angle view of the area of interest so as to position tools, determine location, etc.; and in the other aperture a detailed magnified view of the specimen.

Briefly, these and other objects and advantages of this invention are obtained by converting an optical picture of a small object into an electronic picture and using both optical and electronic means to magnify the picture and then display the picture on a cathode-ray tube. Stereo optical means are used both at the camera and the monitor for an adjacent stereo-pair pickup and reproduction of the picture. The images are then channeled one to each eye and superimposed. All of this equipment may be contained within one enclosure which replaces the conventional optical stereo microscope.

The concepts of the methods and various apparatus of this invention will be better understood through a consideration of the following description, and drawings of exemplary embodiments in which.

Figures 3, 4, 5, 6, 7, 8, 9A:
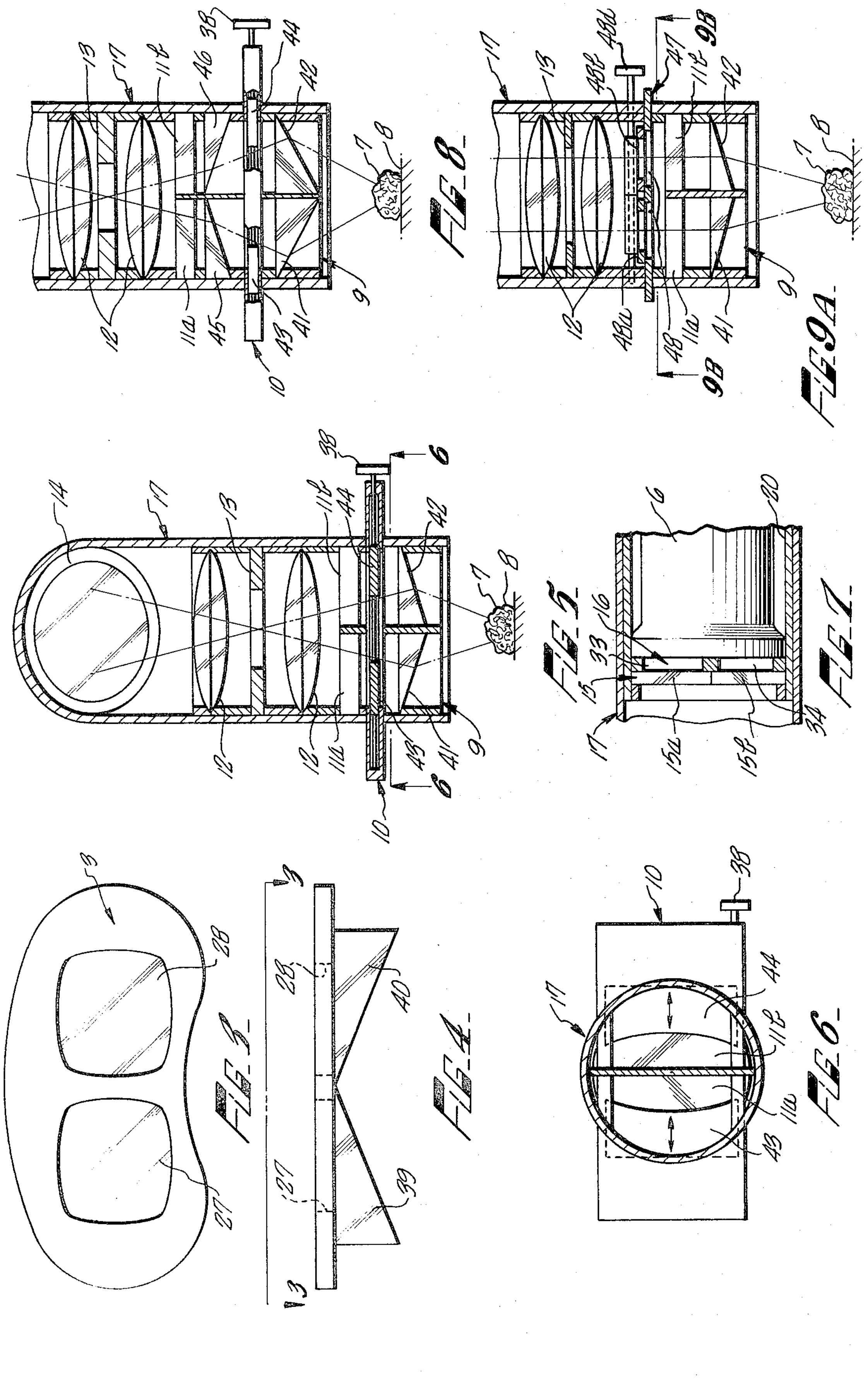
FIG. 3 is a top view of the viewing optics.
FIG. 4 is a side view of the viewing optics.
FIG. 5 is a front view of the pick-up optics.
FIG. 6 is a bottom view of the pick-up optics.
FIG. 7 is a top view of the front of the pick-up tube and its immediately associated optics.
FIG. 8 is a front view of an alternate prism means for the pick-up optics.
Figures 9B, 10, 11, 12, 13, 14, 15A, 15B, 15C, 15D:
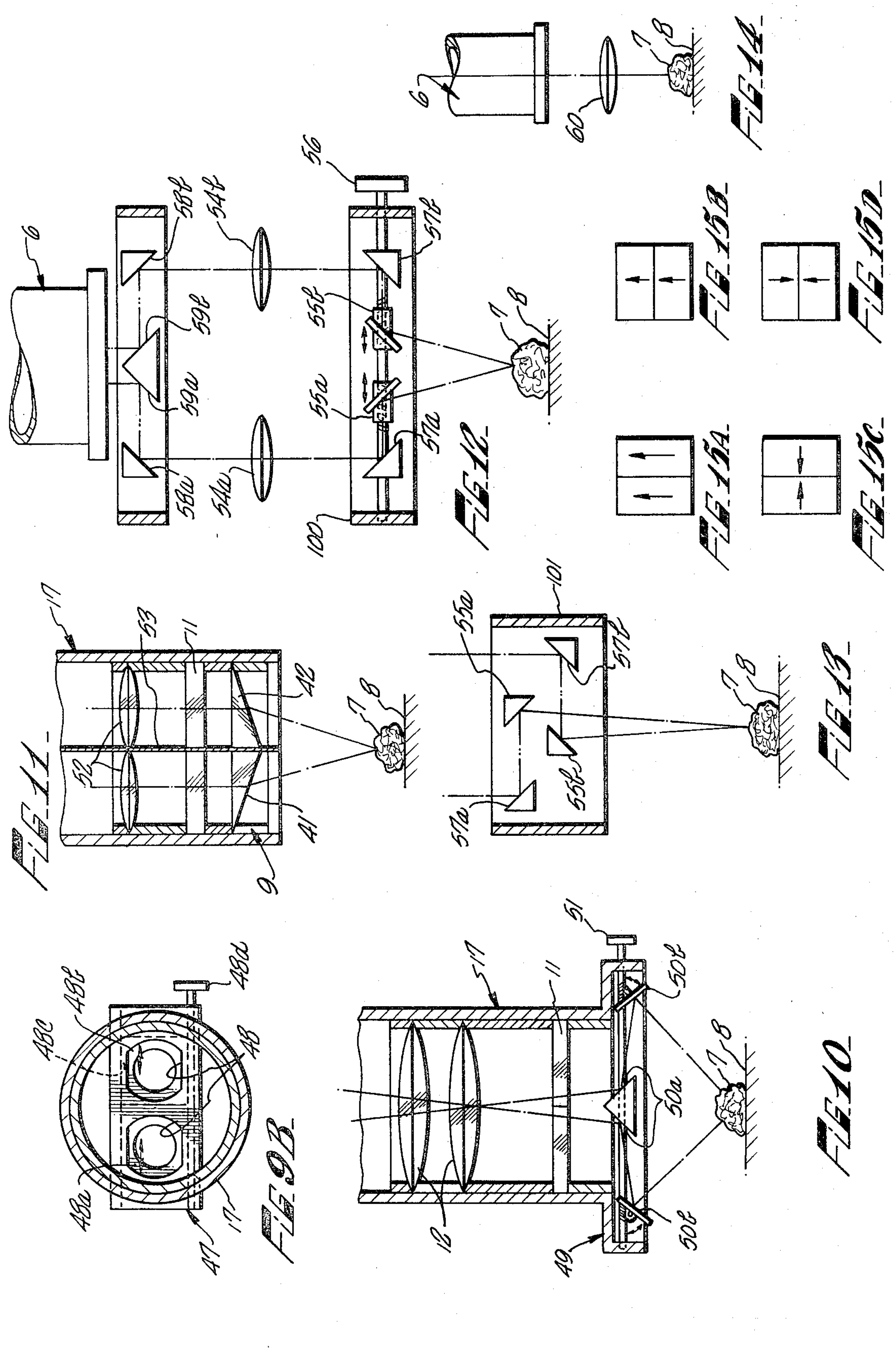

FIGS. 9*a* and 9*b* are respectively front and bottom views of a two aperture means for the pick-up optics;

FIG. 10 is a front view of a beam splitter means for the pick-up optics;

FIG. 11 is a front view of a dual lens means for the pick-up optics;

FIG. 12 is a front view of an alternate dual lens means with a beam splitter for the pick-up optics;

FIG. 13 is a front view of an alternate pick-up beam splitter means for the pick-up optics;

FIG. 14 is a view of an alternate non-stereo lens system for the pick-up optics; and FIGS. 15*a*,15*b*,15*c* and 15*d* illustrate four configurations for positioning the stereo pair on a single television raster.

Figure 1:
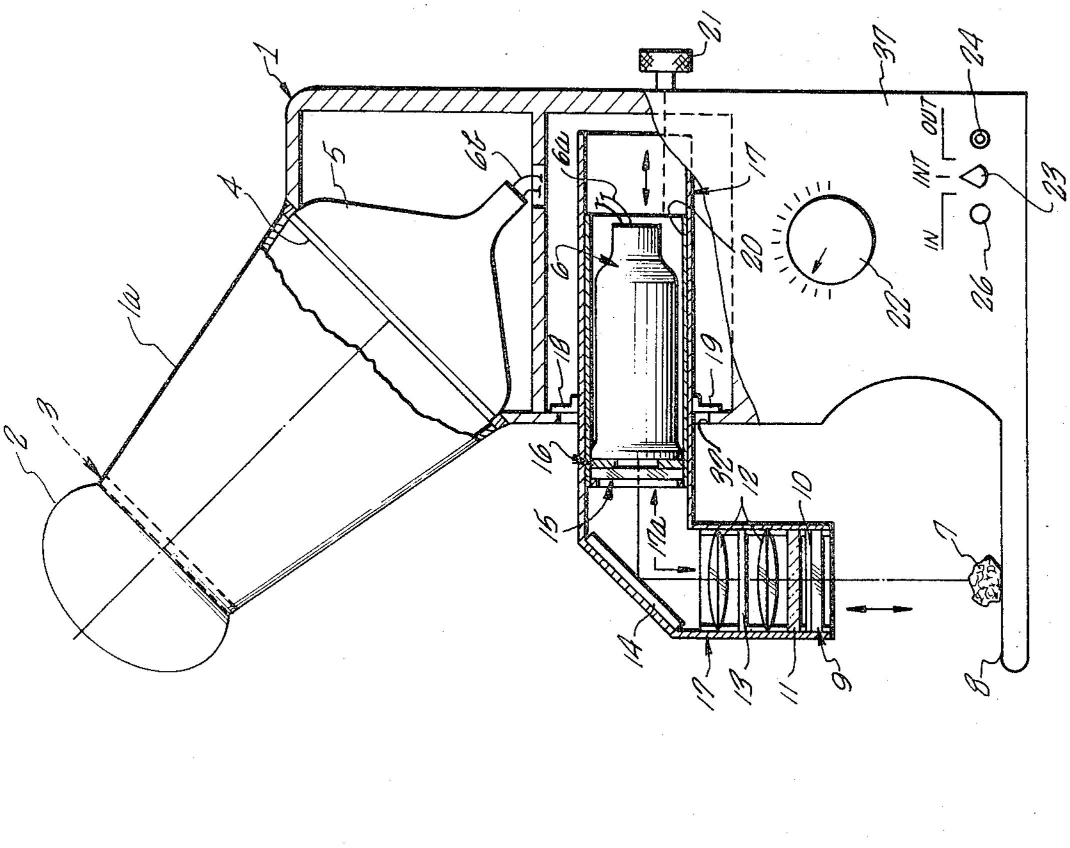
FIG. 1 is a schematic side view of the stereo television microscope, including a television camera and monitor along with stereo optical means, all contained in a single enclosure.

Turning now to FIG. 1, there is shown an exemplary stereo television microscope constructed in accordance with teachings of the present invention in which all of the components are contained within a housing 1. A visor 2 provides an enclosure within which the viewer positions his eyes to look through a viewing optics plate 3. A hood 1*a* of the housing 1 provides a light-proof enclosure so that the viewer sees only the TV picture on a cathode ray tube 5, in front of which is disposed a stereo mask 4. The cathode ray tube 5 is connected electronically to an image pick-up tube 6 through leads diagrammatically illustrated at 6*a*–6*b* and suitable electronics, not shown. Such electronics are not illustrated inasmuch as the same are conventional and familiar to those skilled in the art.

An object 7 is positioned on a stage 8, and light from the object provided in any conventional manner passes through a pick-up optics plate 9, shutters 10, polarizing filter 11, lens 12 with iris 13, and is reflected by a mirror flat 14 through a polarizing filter 15 and mask 16 to the face of the pick-up tube 6. The distance 17*a* between the lens 12 and the face of the tube 6 is variable, and the distance between the object 7 and the lens 12 also is variable as will be described subsequently.

The pickup tube 6, along with all of its associated objects, is housed in the horizontal portion of a carriage 17. The carriage 17 includes baffle plates 18 and 19 extending above and below it, respectively, for the purposes which will be described subsequently. The tube 6 can be moved horizontally back and forth in a cradle, indicated diagramatically at 20, suitable mounted in the carriage 17. A focus control knob 21 is coupled with the cradle 20 for moving the tube 6 horizontally back and forth in small graduations. Similarly, a control knob 22 is coupled with the carriage 17 and the cradle 20 in a suitable manner to allow movement of the carriage 17 up and down vertically within the housing 1, as well as simultaneous movement of the cradle 20 with tube 6 back and forth horizontally, for causing the magnification to zoom from low to high and vice versa. The mechanical linkages used with the knobs 21 and 22 are not shown so as to simplify illustration inasmuch as suitable linkages are known to those skilled in the art. It also will be apparent that the zoom adjustment can be made through a mechanical linkage as indicated, or through an electrical motor drive or the like, if desired.

A control switch 23 is shown mounted on the housing 1. This switch may be suitable coupled with the electronics associated with the pickup tube 6 and cathode ray tube 5, and when turned to "int" (internal) the signal from the pickup tube 6 is connected through the electronics to the cathode ray tube 5. When the switch 23 is turned to "out," an external connector 24 supplies the signal from the pickup tube 6 or electronics to other stereo microscopes, video tape recorders, computers, and so forth. When the switch 23 is turned to "in," an input connector 26 may supply signals from other similar stereo microscopes, video tape recorders, and so forth, to the electronics or the cathode ray tube 5.

Figure 2:
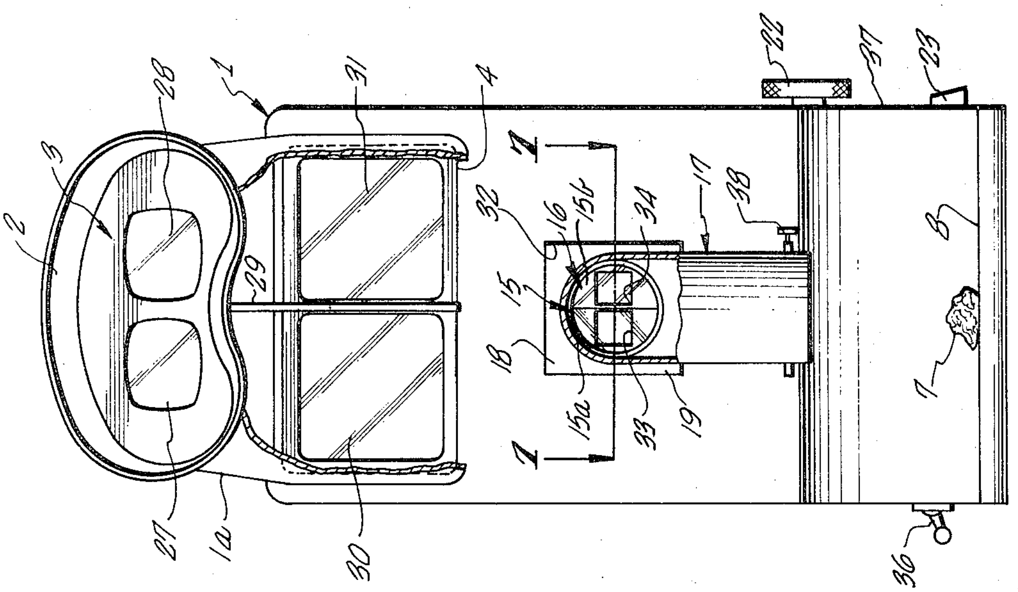
FIG. 2 is a front view of the stereo television microscope.

Turning now to a more detailed discussion of the present concepts and embodiments thereof, FIG. 2 provides a front view of the apparatus and illustrates many of the components seen in FIG. 1. Also seen are apertures 27 and 28 in the optics plate 3. A divider mask 29 insures that each eye only sees one of the stereo-pair which appear in apertures 30 and 31 of the stereo mask 4 in front of the cathode ray tube 5. An opening 32 in the front of the housing 1 provides an area within which the carriage 17 may move up and down vertically. The baffle plates 18 and 19 cover the opening 32 but allow vertical adjustment of the carriage 17. The mask 16 in front of the pick up tube 6 has apertures 33 and 34 therein as seen in FIG. 2. A stereo base control 38 is provided for adjusting the shutters 10 as will become apparent subsequently.

Although not shown, a suitable power cord can provide electrical power when a power switch 36 is activated. The electronics noted earlier may be suitably disposed in base section 37 of the housing 1, and provides the necessary electronic circuitry for the tube 6 and cathode ray tube 5.

FIGS. 3 through 7 illustrate other details of the apparatus of FIGS. 1 and 2. A top view of the viewing optics plate 3 is illustrated in FIG. 3, which shows in greater detail the two apertures 27 and 28. FIG. 4 is a side view of the optical elements involved in the optics plate 3. Wedge prisms 39 and 40 are respectively disposed behind apertures 27 and 28. The bases of the prims 39 and 40 face outwardly from the nose of the individual viewer.

FIG. 5 is a more detailed cross sectional front view of the pickup optics. The pickup optics plate 9 includes wedge prisms 41 and 42 with the bases facing inwardly, and these pick up a stereo pair of images of the object 7 from slightly different points of view. The light of each path is restricted by the shutter 10 which includes a pair of blades 43 and 44 operated by a control knob 38 as best seen in FIG. 6. The control 38 may be termed a stereo base control and moves the blades 43 and 44 simultaneously in or out. The polarizing filter 11 includes two adjacent halves 11*a* and 11*b* each polarized at 90° to the other. The lens 12 includes a conventional variable iris 13 which is only shown diagramatically in the drawings. The mirror flat 14 is front surfaced. FIG. 7 provides a more detailed top view of the front of the pickup tube 6 and its immediately associated optics. The polarizing filter 15 includes 2 adjacent halves 15*a* and 15*b* polarized at 90° to each other. Adjacent halves of filter 15 respectively pass light from adjacent halves of filter 11. The mask 16 includes apertures 33 and 34.

Turning now to operation of stereo television microscope according to the present concepts, the same is turned on by operating the power switch 36. As noted earlier, the specimen 7 under observation is placed on the stage 8. The control knob 22 is adjusted for the desired magnification, which may be, for example, between 8X and 200X. However, the same principles can be used to construct stereo television microscopes of higher or lower magnification. In this example, the pickup tube 6 is a 1-inch Vidicon, and tube 5 is an 8-inch cathode ray tube. The images in apertures 33 and 34 (note FIGS. 2 and 7) are about 1/4 inch square. The images in apertures 30 and 31 in the mask 4 over the tube 5 are about 3 inches square. The electronic magnification then is 12 times. This electronic magnification, plus the magnification of the lens 12, provides the final total magnification of the instrument.

The light from the object 7 is picked up from two slightly different points of view by the optics 9, which consists of two adjacent prism wedges 41 and 42 of about 6 diopters each. The exact value of these wedges varies according to the range of magnification desired, th focal length of lens 12 and the various distances involved. The two images, which form a stereo-pair, of the object now pass through shutters 10. The shutters 10 consists of blades 43 and 44 operated by control 38 which move inward reducing the aperture on each side of the center line. Such aperture reduction actually reduces the stereo base and thereby permits the operator to select his own stereo base. Such an adjustment of stereo base is desirable particularly as magnifications and the "working distance" between the bottom portion of optics 9 and the object 7 vary. By adjusting the stereo base the viewer can maintain a constant relationship of depth to the "working distance" thereby providing a more natural and useable stereo picture. The control 38 can be tied in with control 22 so as to vary the stereo base at the same time the magnification is adjusted. Another method of varying the stereo base is to move optics 9 out from lens 12 toward object 7. The rays will be diverged further apart at this point and the base will be greater. In this case prism wedges 41 and 42 require an increased diopter value and the working distance is reduced.

The polarizing filter 11 follows the shutters 10 and includes two adjacent polarizers with their axis at right angles to each other. One polarizer is in the path of each respective stereo image. The stereo-pair from object 7 now passes through lens 12, which in this example has approximately a 3 inches focal length with an iris 13 set at F/14. The focal length of this lens can vary according to the magnification and desired "working distance." The lens is stopped down by iris 13 to provide a greater depth of field through which portions of object 7 are in focus. Iris 13 may be adjusted according to the depth of field desired and it may be opened up in cases where more illumination is required. The stereo-pair of images are now relayed by the mirror 14 and they pass through another polarizing filter 15, which is identical to polarizing filter 11 in that one image of the stereo-pair is channeled to one side and the other image is channeled to the other side. If the polarizers are not used, portions of the picture overlap as they travel through the lens and area 17*a* between the lens and pick-up tube 6. Area 17*a* is provided by extender tubes in two dimensional television microscopes.

Following the polarizing filter 15 there is mask 16 which has two apertures 33 and 34 that permit one of the stereo-pair to fall on each respective side of pick-up tube 6. This mask 16 is optional. The apertures in mask 16 are square with slightly rounded corners and the resulting observed picture by the viewer will be a single image that is square with slightly rounded corners. Other configurations of image (round, oblong or rectangle) could also be provided.

In the present example the electronics of both the pick-up tube 6 and the cathode-ray tube 5 are adjusted so that the resulting sweep traces out an area that is twice as wide as it is high, and the size of the rasters is slightly larger than the apertures of masks 16 and 4. An examplary bandwidth is 10 mhz and a raster of 525 lines.

The picture picked up by tube 6 is dealt with in the usual manner by the electronics and the resulting signal is fed to cathode-ray tube 5. Since both the monitor and the camera are together in one housing it is possible to eliminate some duplication of circuits, such as power supplies and so forth.

The stereo-pair of images picked up by tube 6 will appear on the face of cathode-ray tube 5. Mask 4 contains apertures 30 and 31, which are proportionately identical to apertures 33 and 34 in front of pick-up tube 6. Mask 29 restricts the left eye which looks through aperture 27 of optics 3 to only see the stereo-image in aperture 30, and likewise restricts the right eye which looks through aperture 28 of optics 3 to only see the stereo-image in aperture 31. The optics 3 in apertures 27 and 28 includes prisms 39 and 40 having about 12 diopters each. Prisms 39 and 40 shift the position of the images at apertures 30 and 31 so that they appear superimposed upon each other. The viewer then sees one single magnified image of object 7 in three dimensions.

When a change or zoom in magnification is required the control 22 is turned to the desired setting. This control is mechanically linked with carriage 17 so that it moves up or down and with cradle 20 so that tube 6 moves back and forth. Alternatively the tube 6 can be fixed and a movable mirror system used to change the path length (such as several inches to several feet) from the upper surface of lens 12 to the face of the tube 6. The relationship between these two movements is established so that object 7 remains in focus regardless of the magnification. However, since there may be slight variations in focus, control 21 is provided to slowly move tube 6 back and forth horizontally in cradle 20. For example, at a magnification of 8X the "working distance" may be 6 inches. In this case cradle 20 carrying tube 6 would travel forward and carriage 17 would move upward in slot 32. The lower portion of slot 32 would then be open but baffle 19 immediately behind it would close off any view into the interior of housing 1. Now, if a magnification of 200X is required, control 22 would be so set and carriage 17 would move downward so that there would be a "working distance" of approximately 2 inches. This movement would open the top portion of slot 32 which, however, would be covered by baffle 18. Likewise, cradle 20 would move backward carrying tube 6. To conserve "working distance" the thickness of prisms 41 and 42 could be reduced by using Fresnel prisms. A zoom lens may be used in place of lens 12, and changes in magnification made by zooming. However, the length of a zoom lens is considerable and this will reduce working distance. Also, if the lens is zoomed its focal length is changed and the diopter power of the prisms also have to be changed. Changes in magnification may be made by using a typical microscope turret with several lenses of different focal lengths and with optics 9 in front of each lens.

The image is optically inverted and reversed by lens 12 and reversed by mirror 14. However, the electronics may be connected to electronically present the picture in its right relationship. Lighting and other details of stage 8 have not been shown as they are well known in the art.

As mentioned previously, the stereo base is not very great if the prisms of optics 9 are too close to lens 12. However, if they are moved out from lens 12 to achieve a greater base, the working distance is reduced. This is a limitation because a large working distance is desirable. There are several alternative methods of picking up a stereo picture which will provide a sufficient stereo base. This is particularly desirable at low magnifications where a significant base is required to obtain satisfactory depth perception and not a flattened field of view. These alternative methods are shown in FIGS. 8 through 13.

In FIG. 8 two additional prisms 45 and 46 have been added with their bases out. These prisms are positioned between prisms 41 and 42 and lens 12. They diverge the light path so that the light rays from object 7, which strike the outer edge of prisms 41 and 42, are diverged by prisms 43 and 44 so as to be focused by lens 12 on the pick-up tube 6. Therefore, a significant stereo base is obtained while maintaining an adequate working distance. For example, a 3 inches lens at 8X with a stereo base of 1/4 inch may have a working distance of 6 inches (between object 7 and the lower part of optics 9). The stereo base can be increased to 1/2 inch by moving prisms 41 and 42 downward and out from lens 12 and thereby reducing the working distance to 4 inches. However, by adding prisms 45 and 46 the 1/2 inch base is obtained and the working distance is only reduced to 5 inches. In both cases the diopter power of prisms 41 and 42 is increased.

In FIGS. 9*a* and 9*b* aperture plate 47 has been added to the basic configuration. This plate has two slots 48 which are in line with apertures in masks 48a and 48b which are horizontally separated from each other. The distance between the center points of the apertures in masks 48a and 48b is the stereo base. Prisms 41 and 42 are now of a lower diopter power since they do not converge the light rays from object 7 as much as in FIG. 5. However, the diopter power of the prisms must be changed as the magnification and working distance is changed; or the distance apart of the apertures in masks 48a and 48b can be varied to change the stereo base. Then the diopter power of prisms 41 and 42 can be fixed. (Shutters 10 with blades 43 and 44 are not used in this configuration.) Masks 48a and 48b can be moved in or out in track 48c by turning knob 48d, which is attached to a threaded shaft, and masks 48 a and 48b move on respective left and right hand threaded carriers.

FIG. 10 shows another variation of the basic configuration. In this case a beam splitter 49 is used instead of optics 9 and shutters 10, and includes an inner set of reflectros 50a (either prisms or mirrors). The light rays from object 7 are reflected by reflectors 50b to refectors 50a and then on through lens 12. The horizontal distance between the center of reflectors 50b is the stereo base. This is rather large and may be three-quarters of an inch or more. Therefore, this configuration is best suited for low magnifications. To maintain the stereo base as low as possible, lens 12 should have a long focal length so that the light rays do not diverge rapidly, and beam splitter 49 should be very close to lens 12. If magnification and working distance is changed, reflectors 50b must be altered in angle so as to converge on object 7. This is accomplished by turning knob 51, which is attached to a threaded shaft which turns left and right hand gears on reflectors 50b and causes them to rotate in or out. Polarizing filter 11 is used to keep the images separate.

FIG. 11 illustrates another method of picking up a stereo-pair of images. In this case a matched pair of lenses 52 is used instead of lens 12. The center of lenses 52 are separated horizontally by, for example, 1/4 inch (which is one-half of width of a 1 inch vidicon raster). The 1/4 inch is then the stereo base. Prisms 41 and 42 in optics 9 converge the rays from object 7 so they pass through lenses 52. No shutters are necessary as they would not affect the stereo base. The base can be changed by horizontally moving lenses 52 slightly apart or together using a mechanism similar to that discussed with respect to FIG. 9. Filters 11 working in conjunction with filters 15 of FIG. 7 can be used to channel each of the stereo-pair of images to their respective sides of tube 6. Another method of channeling without the filter light loss is to use thin walled baffle 53 between lenses 52 and tube 6. Another advantage of this configuration is that the stereo-pair of images falling on tube 6 would have a similar light distribution. In the other configurations the light distribution tends to be uneven because in one of the stereo images the reduced light which passes through the outer portion of the lens falls on the left side and in the other image the reduced light is on the right side. Prisms 41 and 42 used in this configuration and in that of FIG. 9 have a very low diopter power. This is an advantage as the prisms used in configurations of FIGS. 5 and 8 have a higher diopter power which results in chromatic aberations and distortions.

The configurations of FIGS. 9 and 11 result in the stereo pair of images being reversed or "crossed" on the screen of CRT tube 5. That is, the right eye's image appears on the left side in aperture 30 and the left eye's image appears in the right side in aperture 31 of mask 4 in FIG. 2. Therefore, prisms 39 and 40 of FIG. 4 should be oriented with their bases in and mask 29 removed. Then, the right eye looking through aperture 28 of optics 3 in FIG. 2 superimposes the image in aperture 30 of mask 4 with the image in aperture 31 seen by the left eye looking through aperture 27. To eliminate each eye from also seeing a side image of the other picture, two sets of polarizing filters are required. One set of filters with its axis at 90° to each other is placed in apertures 27 and 28 of optics 3. The outer set of filters with their axis at 90° to each other is placed in apertures 30 and 31 of mask 4. These filters are oriented so that the right eye only sees the image in aperture 30 with the image in aperture 31 appearing black, and the left eye only sees the image in aperture 31 with the aperture 30 appearing black. In this case optics 3 may be incorporated in pairs of glasses or viewers and hood 1a may be removed so that group observation of the picture on CRT 5 can take place in 3D.

FIG. 12 illustrates a preferred embodiment of picking up a pair of stereo images in which a matched pair of lenses 54a and 54b are used instead of lens 12. A beam splitter 100 includes reflectors 55a and 55b, which are adjusted by control 56, and reflectors 57a and 57b. In front of tube 6 there are corresponding pairs of outer reflectors 58a and 58b and inner reflectors 59a and 59b. The light from specimen 7 is picked up by reflectors 55a and 55b. These can be separated or brought together, thereby varying the stereo base, by adjusting control 56. Reflectors 57a and 57b may be adjusted to converge on object 7 by a knob arrangement (not shown) like 51 in FIG. 10. The light is then focused by lenses 54a and 54b respectively onto reflectors 58a and 58b. These in turn reflect the images onto 59a and 59b where they are reflected onto tube 6. In this configuration there is no need for two sets of polarizing filters 11 and 15 shown in FIGS. 5 and 7 through 11 or for baffle 53 shown in FIG. 11 because the image paths are separated by a considerable distance.

In the configuration of FIG. 12 the stereo pair of images are "crossed." They may be uncrossed by using beam splitter 101 shown in FIG. 13 where the right eye picture is picked up by reflector 55a and relayed to reflector 57a, and where the left eye picture is picked up by reflector 55b and relayed to reflector 57b. Another method of uncrossing the images is to use a pair of Amici roof prisms at pick-up tube 6. These prisms along with the appropriate connection of the pick-up tube sweep circuits willl result in uncrossed images.

FIG. 14 illustrates an arrangement where a compound microscope objective lens system 60 is used in place of lens 12 between specimen 7 and pick-up tube 6. Then a highly magnified view (100X to 2,000X) of specimen 7 is seen on CRT screen 5. In this case hood 1a and mask 4 are swung aside for a single magnified display view of the specimen. Where low non-stereo magnifications (2X to 120X) are desired, stereo optics 9 can be removed from lens 12 of the basic configuration shown in FIGS. 1 through 7. Polarizing filters 15 need not necessarily be removed.

A non-stereo magnified view can be obtained in one of the apertures of mask 4 and a non-stereo general area view can be secured in the other aperture of mask 4. In this case two different focal length lens can be used in the configuration of FIG. 12 or a similar lens positioned differently can be used. Beam splitter 100 is not required. Hood 1*a* is swung out of the way.

FIGS. 1 through 14 illustrate methods of three-dimensional television wherein a single television pick-up tube 6 and a single cathode-ray display tube 5 are employed. In these illustrations the stereo pair appear side-by-side as illustrated in FIG. 15*a*. However, the raster may be divided as illustrated in FIG. 15*b* so that the stereo pair appear one above the other. There are certain advantages to this; for example, where a television system has much better vertical linearity than horizontal linearity. Since the linearity in the center of the picture is considerably better than that at the edges, configurations such as shown in FIGS. 15*c* or 15*d* are even more desirable. In the configurations shown in FIGS. 15*b*, *c* and *d* optical provisions known to those skilled in the art are made at both the pick-up tube and the monitor's CRT tube so that the viewer observes the final picture in proper orientation.

Not specifically shown, but clearly evident to those skilled in the art, are other methods of three dimensional television which can be used with this invention. For example, two pick-up tubes can be used at the camera, one for each of the stereo pair. Also, two CRT tubes can be used at the monitor so that each one displays one of the stereo pair. Another method is to transmit first one of the stereo pair and then the other sequentially using appropriate shutter or oscillating reflector means at the camera. In this case, shutter means or a combination of a rotating filter at the CRT and filters in front of the eyes must be used so that each eye receives its proper image of the stereo pair. Lenticular means of pick up and/or reception may also be used to transmit the stereo pair. This invention can be used with any method of three dimensional television or film or with other three dimensional images such as those created by other methods of pick-up (including mechanical scanning methods) and by other methods of reproduction (including laser and other types of displays). Also the invention can be used with any type of color television or display.

Another feature of an electronic microscope is that the object may be illuminated by other than visible electro-magnetic rays (such as infrared or ultraviolet). In this case a pick-up tube sensitive to such rays is used. Also a low light level pick up tube could be used and an adequate image would be seen of objects dimly illuminated which would be damaged by normal illumination. Another feature is that by electronic reversal of polarity the picture can appear white on black instead of black on white. Further, the viewer's eyes are protected in case the illuminating rays are dangerous, such as when welding or cutting with a laser beam. However, proper shielding from X-rays generated by the CRT tube should be provided. One method is to point the CRT tube upward and use a mirror flat between it and the viewer, who is off to one side. Alternatively, radiation absorbing glass may be used between the CRT 5 and the viewer's eyes.

When switch 23 is to "out," the signal from tube 6 cannot only be connected to cathode-ray tube 5 but also be sent out to other equipment through connector 24. For example, this stereo television microscope may be connected to a number of other stereo microscopes for instruction purposes and the instructor, by throwing this switch, may cause the students to all see the same object 7 that he is observing. On the student's microscope, switch 23 is thrown "in" so that they receive the signal applied to their connector 26. In another case, an inspector may throw switch 23 on his microscope to "in" so as to pick up a signal on his connector 26 from some other microscope(s). The external signal then is connected to his cathode-ray tube 5 so that he can observe and inspect the work being undertaken at another location.

A further example is that switch 23 can be thrown to "out" and a coax cable connected from connector 24 to a conventional video tape recorder. The picture then is recorded in the regular fashion on the video tape recorder; and the stereo picture can be played back on this or other stereo television microscopes or on an ordinary TV monitor with the appropriate optics for later viewing in 3D. An ordinary TV monitor without stereo optics can be used for monitoring purposes in 2D since the two pictures are clear and undistorted.

Another use of the stereo television microscope is for switch 23 to be thrown to "out" and connector 24 connected to a computer. The elements of the picture can be electronically digitized and the signal processed in the computer to obtain greater contrast, pick out or identify particular components of the object, etc. The picture can be stored in the computer and at a later date the stereo-pair can be displayed and viewed in 3D or can be readout in "real time."

A further example is that a Polaroid camera, with the use of a half silvered mirror in hood 1*a*, can be employed to take a photograph of the stereo-pair on the face of cathode-ray tube 5. In this case, mask 29 is swung out of the way. The Polaroid photograph could then be viewed with a conventional stereoscope at a later date.

The pickup portion of the stereo television microscope can be located in a dangerous, remote or inaccessible location and the viewing portion can be located at a more convenient spot. A cable, broadcast or other type of transmission link carries the signal.

The stereo television microscope has numerous advantages over a stereo optical microscope. The conventional stereo microscope must be adjusted closely to match the operator's eye spacing. This requires that the binocular eye pieces be accurately placed (within 1/64 of an inch) a precise distance apart. Further, the eye pieces must be independently focused to compensate for the difference in visual acuity between the eyes. Finally, any remaining deviation between the microscope optics and the operator's visual system is compensated for by the operator's optic system. This abnormal compensation often "pulls" the eyes and creates eye strain, and prolonged viewing produces eye fatigue and resultant headaches. As a single specimen is viewed first by one person and then by another, all of the adjustments must be made each time to compensate for the individual viewer. Such is not the case with the present device which has been designed for images to be seen normally without eye strain and with the eyes in a relaxed position. No adjustment is required when changing from one viewer to another. In order to keep the picture in focus with the regular optical stereo microscope, head movement must be restricted, which contributes to aggravated neck and body fatigue when viewing for long periods of time. The result in microcircuitry production is poor efficiency, a large turnover of workers and numerous defects in expensive products. The criticality of interocular adjustments required by the optical stereo microscope is such that many operators fail to achieve a picture to both eyes. An operator without previous microscope experience can instantly view a 3D image with both eyes using the present instrument.

Unlike optical microscopes where the eye must be maintained within 1/8 to 1/4 inch of the eye pieces before the image can be seen, the image from the present instrument can be viewed in complete ease and comfort over a range of 6 inches back and forth and over 1 inch side-to-side. The operator's face, even when wearing eye glasses, need not come in contact with the instrument. This complete freedom from the confinement of the conventional binocular eye pieces permits the operator hours of continuous viewing without body fatigue.

The basic design of the present instrument allows the operator to sit comfortably with a natural vertical body and head position. The operator's hands are conveniently positioned at table height, and viewing the monitor only requires a slight downward tilting of the head. The operator can easily look from a magnified view to a direct view of the object. The ability to quickly view objects directly speeds assembly operations by allowing the operator to bring parts and working tools quickly into close proximity before returning to the magnified view. The ordinary optical microscope requires that the operator look down at a considerable angle; whereas, the present instrument has only a slight angle such as that used naturally in reading a book.

The ordinary microscope is only in focus at one point and objects closer or further away are blurred. The basic electro-optics of the present system achieve an extreme depth of view at all magnifications. For example, a field of view three-eighths of an inch square may have a depth of view of 1/2 inch. This great depth of field enables objects to be viewed in different focal planes clearly without the constant "up and down" motion required with conventional microscopes to obtain a clear view of the entire object. During assembly operations tools can be quickly brought into focus, and at low power parts may be held by hand thus eliminating fixtures and time required when viewing under regular microscopes with their limited depth of field.

The use of conventional electronics in the present instrument allows a basic electronic magnification, an increased image contrast, and a righting of inverted images. These features result in a considerable simplification of the pick-up lens system. Also the electronics intensify the image. This results in a lens system with a higher "F" number, which means less light required on the subject and a greater depth of field.

A comparison of optical and video stereo microscopes discloses that the specifications of the video microscope are, in most regards, equal to or superior to those of the optical microscope and that the video microscope has a number of additional features not available in an optical stereo microscope.

Table I provides a comparison of the features of a typical optical stereo zoom microscope compared to a typical stereo television zoom microscope as disclosed herein. The total zoom range of each is approximately the same. However, for the optical microscope to obtain its full range it must be used with an auxiliary lens and a 25X eyepiece. The zoom mechanism in the optical microscope consists of a lens element motion. In the video microscope the customary zoom lens need not be used and instead the distance between the specimen and the lens is varied simultaneously with a variation in the distance between the lens and the pick-up tube. The combination of these two movements provides the zooming action and is accomplished with a simple lens. The optical zoom mechanism requires a highly matched pair of lenses.

The working distance of the video microscope is about double that of the optical microscope, and this working distance varies gradually from about 6 inches to about 2 inches. On the other hand, in the optical microscope, the working distance is fixed at about 3 inches at the low range of magnifications and at about 1 inch at the high range of magnifications. The depth perception through zoom is excellent in the case of the video microscope. This is because the convergence angle remains fixed throughout the entire zoom. The convergence angle of the optical microscope is fixed at low magnifications and depth perception is good, but it is excessively great at high magnifications.

The depth of field of the video microscope is excellent throughout the entire range of magnifications. In the case of the optical microscope, the depth of field is restricted at all magnifications. The reason for this is that the video microscope operates with the lens stopped down and the iris setting varies as the magnification varies; whereas, in the optical microscope the lens is operated wide open in order to obtain enough light through the optical system. The video microscope does not require as much light because the normal pick-up tube is sensitive to low levels of illumination. A low light level pick-up tube may be used to even further increase the depth of field and protect the specimen from excessive illumination.

The brightness through zoom is automatically adjusted by mechanical and electronic means in the video microscope. The iris can be controlled to open up as the zoom takes place and the television circuitry may include electronic compensation for several thousand to one on the pick-up tube. In the case of the optical stereo microscope the image varies in brilliancy as the zoom takes place.

The eyepieces in the typical optical microscope are a highly matched pair of lenses of 10X. In the video microscope the television camera and monitor provide an electronic eyepiece with about 12X magnification. If a 32 megahertz band-width television system is used set at 1,023 lines per frame then the horizontal center resolution of each image of the stereo-pair is about 625 TV lines and the vertical center resolution is about 650 TV lines. In this case the TV lines will be so close together that they will not be observed at the 12 inches viewing distance and the picture elements will be close enough together so as not to be individually resolved at low magnifications. At approximately 80X the individual picture elements will limit the resolution of the picture and empty magnification will begin. In the case of the optical microscope the eyepiece has a high resolution. However, the total resolution of the combined optical system drops off in a similar manner to the video microscope and empty magnification begins at about 56X. Although the optical stereo microscope has a higher resolution at lower magnifications, this will not be apparent since the eyes limiting resolution is about seven or eight lines per millimeter.

The cost of the video microscope is almost directly dependent upon the bandwidth of the TV system. In those applications where high resolution is not required, low priced TV cameras and monitors can be used and the cost becomes comparable to that of optical stereo microscopes. When high resolution systems are used, then the cost of the video microscope may exceed that of the optical one.

The eye points (that is the position at which the image can be best observed) are very close to the eyepieces in an optical microscope and very little movement is possible either back or forth or side to side. In the video microscope up to 6 inches movement back and forth and 1 inch side to side is possible without loss of the stereo picture. Corrective eyeglasses may be used with the video microscope; whereas, it is difficult to wear glasses with the optical microscope. Ocular adjustment is necessary with the optical microscope because the interocular distance from one viewer's eyes to another varies. However, the video microscope does not require such adjustment since its eye apertures are large enough to accommodate any viewer.

The direction of view of the optical microscope is usually downward at about 30° from vertical. In the video microscope the direction of view can be horizontal or at any angle so desired. Image inversion is accomplished electronically very simply by electronic means in the video microscope. The optical microscope requires prisms which provide further complications.

The picture of the optical microscope is in color. A color camera and monitor can be used in the video microscope but this does add to the cost. "False" color can be used with the video microscope. In this case the gray level of the black-and-white camera is used to artificially code the image in a scale of colors which are viewed on a color monitor.

In the optical microscopes the principal maintenance is concerned with adjustment and alignment of the optics and its mechanism. In the video microscope the electronics preferably are solid state, which have an extremely long life, and the only two items that would require changing every so many thousand hours would be the pick-up tube and the cathode-ray tube.

Some of the particular features of the video microscope not available in optical microscopes are: (1) Any number of video microscopes can be connected together for allowing multiple viewing, and also separate monitors can be used so that a large number of persons can see the same picture; (2) The video picture can be instantly recorded on video tape and immediately played back in 2D or 3D; (3) Illumination other than visible light may be used with the video microscope. For example, infrared, ultraviolet, or X-rays can be used to illuminate the specimen and then a pick-up tube employed which is sensitive to that particular portion of the spectrum; (4) The video picture can be made negative or positive at will, which aides in observation of the specimens features; and (5) The electronic picture can be processed by a computer or other electronic means to enhance the picture and enable analysis of the picture in a variety of ways.

From the foregoing description, it is evident that the present invention provides a greatly improved method and apparatus for viewing in three dimensions magnified views of small objects. Various changes and modifications falling within the scope and spirit of this invention will occur to those skilled in the art. The invention is, therefore, not to be thought of as limited to the specific examples set forth merely for illustrative purposes.

TABLE I

| Specifications | Optical | Video |
|---|---|---|
| Total zoom range | 8×–40× or 40×–200×* | 8×–200× |
| Working distance | 3'' to 1'' | 6'' to 2'' |
| Depth perception through zoom | good (8×) distorted (above 40×) | excellent (8×–200×) |
| Depth of field | restricted | excellent |
| Brightness through zoom | variable | constant |
| Eyepieces | optical | electronic |
| Total resolution | high | medium to high |
| Eye points | close and restricted | wide range |
| Use with corrective eyeglasses | difficult | normal |
| Direction of view | 30° from vertical | any |
| Image inversion | optical prisms | electronic |
| Color | yes | optional |
| Maintenance | low | low |
| Multiple viewing | no | yes |
| Recording | no | yes |
| Non-visible illumination | no | yes |
| Electronic processing | no | yes |

*With 2× auxiliary lens and 25× eyepiece

What is claimed is:

1. Stereo television microscope apparatus for providing a three dimensional enlarged view of an object comprising
   first optical means including a beam spliter, for picking up images of the object from different angles and magnifying said images, said first optical means including image separation means for providing respective separate different images of the object,
   pickup means for receiving images of the object and providing electrical signals representative of the respective images,
   display means for displaying the magnified images represented by said respective signals, and
   second optical means for directing one image to a first eye and a different image to a second eye of a viewer.
2. Apparatus as in claim 1 wherein
   said display means comprises a cathode ray tube.
3. Apparatus as in claim 1 wherein
   said display means comprises a cathode ray tube for displaying continuous enlarged images.
4. Apparatus as in claim 1 wherein
   said first and second optical means, pickup means and display means are mounted together in a single housing.
5. Apparatus as in claim 1 wherein
   said display means and second optical means are remotely located with respect to said first optical means and said pickup means.
6. Apparatus as in claim 1 wherein
   said image separation means comprises means for reflecting and relaying said respective images of the object to said pickup means by separate and independent light paths.
7. Apparatus as in claim 1 wherein
   said first optical means including a movable optical assembly and said pickup means including a movable pickup tube and a path between the object and said first optical means and a path between said first optical means and said pickup means are variable, thereby allowing variable magnification of the view of the object.

8. The apparatus as in claim 1 wherein said first optical means includes a plurality of prism wedges for picking up images of the object from different angles.

9. Apparatus as in claim 1 wherein said images separation means comprises means for refracting and relaying said respective images of the object of said pickup means by separate and independent light paths.

10. The apparatus as in claim 1 wherein said first optical means includes a plurality of mirror flats for picking up images of the object from different angles.

11. Apparatus as in claim 1 wherein said pickup means comprises a single television camera means.

12. Apparatus as in claim 11 wherein said display device comprises a cathode ray tube.

13. The apparatus as in claim 1 wherein said second optical means includes a viewing means comprising a visor and a hood means, said hood means providing a light-proof enclosure between said display means and said visor, and a viewing optical plate positioned between said display means and said visor for viewing said display means.

14. The apparatus as in claim 13 wherein said viewing optical plate includes a first and second aperture, and a first and second wedge prism respectively deposed behind said first and second aperture.

15. The apparatus as in claim 1 wherein said first optical means includes a matched pair of lenses for image separation.

16. The apparatus as in claim 15 including a baffle, said baffle being positioned between said first optical means and said pickup means for keeping the images separate.

17. Apparatus as in claim 1 wherein said image separation means includes filter means for relaying said respective images to said pickup means by a single light path.

18. Apparatus as in claim 17 wherein said filter means comprises two sets of mutually exclusive polarizing filters.

19. Apparatus as in claim 17 wherein said filter means comprises two sets of mutually exclusive colored filters.

20. Stereo television microscope apparatus for providing a three dimensional enlarged view of an object comprising first optical means having an adjustable stereo base for picking up images of the object from different angles and magnifying said images, and image separation means for providing respective separate different images of the object, electro-optical pickup means comprising a single electro-optical pickup tube for receiving the separated images from said first optical means and providing electrical signals representative of the respective separated images from said first optical means, display means comprising a single display device for displaying continuous magnified images represented by said respective signals, and second optical means for directing one image to a first eye and a different image to a second eye of a viewer.

21. A method of microscopy for providing substantially enlarged three dimensional views of a small object comprising the steps of optically picking up two images of an object from different angles and relaying said images in a side by side relationship thereby forming a first and second image, maintaining the first image separate with respect to the second image, by filtering each image independently with matched exclusive filters, converting said electrical signals to respective enlarged visual images, and channeling one image to each of the eyes of a viewer.

22. Stereo television microscope apparatus for providing a three dimensional enlarged view of an object comprising first optical means for picking up images of the object from different angles and magnifying said images, said first optical means including image separation means for providing respective separate different images of the object, said first optical means including an aperture plate having two slots horizontally separated from each other for image separation, pickup means for receiving images of the object and providing electrical signals representative of the respective images, display means for displaying the magnified images represented by said respective signals, and second optical means for directing one image to a first eye and a different image to a second eye of a viewer.

23. Stereo television microscope apparatus for providing a three dimensional enlarged view of an object comprising first optical means for picking up images of the object from different angles and magnifying said images, said first optical means including image separation means for providing respective separate different images of the object, said first optical means including a matched pair of lenses for image separation and further including a pair of prisms, capable of conveying rays from the object to allow the rays to pass through said matched pair of lenses, pickup means for receiving images of the object and providing electrical signals representative of the respective images, display means for displaying the magnified images represented by said respective signals, and second optical means for directing one image to a first eye and a different image to a second eye of a viewer.

24. The apparatus as in claim 23 including two sets of mutually exclusive filters, said first set of filters being positioned in a first optical means and said second set of filters being positioned immediately in front of said pickup means.

25. Stereo television microscope apparatus for providing a three dimensional enlarged view of an object comprising first optical means for picking up images of the object from different angles and magnifying said images, said first optical means including image separation means for providing respective separate different images of the object, said first optical means including a matched pair of lenses for image separation and further including a beam splitter, said beam splitter capable of converging rays from the object to allow the rays to pass through said matched pair of lenses, pickup means for receiving images of the object and providing electrical signals representative of the respective images, display means for displaying the magnified images represented by said respective signals, and second optical means for directing one image to a first eye and a different image to a second eye of a viewer.

26. The apparatus as in claim 25 wherein said beam splitter includes two pair of reflectors positioned to cross the images.

27. Stereo television microscope apparatus for providing a three dimensional enlarged view of an object comprising first optical means including means for providing an adjustable stereo base, for picking up images of the object from different angles and magnifying said images, said first optical means including image separation means for providing respective separate different images of the object, pickup means for receiving images of the object and providing electrical signals representative of the respective images, display means for displaying the magnified images represented by said respective signals, and second optical means for directing one image to a first eye and a different image to a second eye of a viewer.

28. A method of microscopy for providing substantially enlarged three dimensional views of a small object comprising the steps of adjusting the stereo base for optimum depth perception at a given working distance, optically picking up images of an object from different angles thereby forming a first and second image, maintaining the first image separate with respect to the second image by optically channeling each image independently, converting said images to electrical signals representative of said images, converting said electrical signals to respective enlarged visual images, and channeling one image to each of the eyes of a viewer.

* * * * *

UNITED STATES PATENT OFFICE
CERTIFICATE OF CORRECTION

PATENT NO. : 3,818,125

DATED : June 18, 1974

INVENTOR(S) : JAMES F. BUTTERFIELD

It is certified that error appears in the above-identified patent and that said Letters Patent are hereby corrected as shown below:

Column 2, Line 1, change "for" to -- the --.
Column 2, Line 31, change "further" to -- farther --.
Column 2, Line 41, change "picturemaking" to -- picture, making --.
Column 2, Line 48, change "individuals" to -- individual's --
Column 3, Line 16, delete "an".
Column 3, Line 32, change "be" to -- the --.
Column 5, Line 28, change "suitable" to -- suitably --.
Column 5, Line 67 (last line) change "prims" to -- prisms --.
Column 7, Line 6, change "inches" to -- inch --.
Column 7, Lines 31-32, change "rectangle" to -- rectangular --.
Column 8, Line 57, change "inches" to -- inch --.
Column 9, Line 21, change "reflectros" to -- reflectors --.
Column 9, Lines 22-23, change "refectors" to -- reflectors --.
Column 9, Line 66 (penultimate line), change "aberations" to -- aberrations --.
Column 10, Line 15, change "outer" to -- other --.
Column 10, Line 55, change "willl" to -- will --.
Column 12, Line 16, change the ";" to -- , --.
Column 16, Line 32 (first paragraph of Claim 1), change "spliter" to -- splitter --.
Column 18,* Lines 10-11, (body of claim 21) insert the following:
--converting said images to electrical signals representative of said images, and--

*between

Signed and Sealed this

Twenty-first Day of September 1976

[SEAL]

*Attest:*

RUTH C. MASON
*Attesting Officer*

C. MARSHALL DANN
*Commissioner of Patents and Trademarks*